United States Patent Office 3,320,130
Patented May 16, 1967

3,320,130
MEDICAMENT FOR COLITIS, GASTROENTERITIS AND ENTEROCOLITIS
Michel C. G. A. Henry, Neuilly-sur-Seine, France, assignor to EURORGA, Paris, France, a company of France
No Drawing. Filed July 16, 1963, Ser. No. 295,516
Claims priority, application France, July 19, 1962, 904,533; July 24, 1963, 939,081
10 Claims. (Cl. 167—73)

This invention relates to medicaments useful in the treatment of certain affections of the gastro-intestinal tract.

The present invention provides a process for the preparation of such a medicament which comprises culturing separately, on milk containing gastro-pyloric mucin of the pig, lysine, arginine and histidine, *Lactobacillus acidophilus* and non-pathogenic *Escherichia coli*, the cultures being either lyophilized individually then mixed together, or firstly mixed in which case the mixture is maintained at room temperature until it is free from histamine and then lyophilized.

The milk employed is preferably sterilized skimmed milk, and the quantity of pig's gastropyloric mucin contained therein (calculated dry on the solids content of the milk) preferably varies from 0.5% to 15% by weight. Each of the three amino acids is preferably present in a proportion of about 0.5% by weight calculated in the same way. The gastro-pyloric mucin is preferably added as a solution (containing from 1% to 2.5% of solids) which is obtained by subjecting a mixture of red mucous membrane and pyloric antrum of the pig, to extraction with an aqueous solution of caustic soda.

The lactic ferment *Lactobacillus acidophilus* is preferably a strain derived from the stools of healthy babies, which has been cultivated in the presence of antibiotics so as to achieve resistance thereto. For this purpose, a culture medium may be used which contains, more especially, the following antibiotics.

| Antibiotics (origin and nature): | Dosage per ml. of culture |
|---|---|
| Penicillium: | |
| Penicillin | units__ 200 |
| Actinomycetes: | |
| Streptomycin | 5000γ |
| Tetracycline | 1000γ |
| Chloroamphenicol | 200γ |
| Erythromycin | 2000γ |
| Spiramycin | 2000γ |
| Oleandomycin | 2000γ |
| Novobiocin | 2000γ |
| Bacillus: | |
| Colimycin | 2000γ |

The culture medium used is preferably the same as that used in the process of the invention, but may also contain additional substances, e.g., vitamin $B_{12}$. A specific preferred composition is as follows:

| | |
|---|---|
| Sterilized skimmed milk | ml__ 950 |
| 1% aqueous solution of pig's gastro-pyloric mucin (containing 1–2.5% of solids) | ml__ 50 |
| Lysine | g__ 0.5 |
| Arginine | g__ 0.5 |
| Histidine | g__ 0.5 |
| Crystalline vitamin $B_{12}$ | gμ__ 5 |

When it has acquired the resistance to antibiotics, the lactic ferment is seeded on a similar culture medium containing no antibiotic. Before the seeding, the culture medium is sterilized by heating twice at 100° C. with an interval of 24 hours between heating periods. Sterility of the medium should be checked.

After seeding with lactic ferment, the medium is incubated at 41° C. until a homogeneous curdled product is obtained, which takes about 24 hours. The incubation may be further continued, but there is no practical advantage in so doing. The proportion of lactic acid produced is then of the order of about 0.8% to 1% and the number of revivifiable microorganisms reaches about $10^{11}$ to $10^{14}$ per ml. The curd may then be directly frozen, for example at —60° C. (after having been stirred) and lyophilized. However, it is also possible, before freezing, to neutralise the lactic acid produced to a pH of about 6.5 with a sterilized aqueous solution of trisodium phosphate. Generally speaking, from 3 to 4.5 g. of trisodium phosphate (in the form of sterilized aqueous solution) per litre of medium is required in order to obtain this result.

The *Escherichia coli* used are preferably strains isolated from stools of healthy babies, which acidify lactose-containing media in less than 24 hours, give indole, do not grow on Simmons medium containing citrate, and are free from haemolysins active against various red corpuscles. It is advantageous to choose strains which show the greatest resistance to common antibiotics. In addition, the absence of antigens is checked by the techniques of agglutination and passive haemagglutination. The absence of pathogenic activity is verified by the following tests.

(1) On oral absorption:

(a) in the mouse, in quantity of 500 million microorganisms in a single dose,
(b) in the guinea pig, in a quantity of 3 billion microorganisms in one dose, and
(c) in the pig, in a quantity of several litres of a culture containing $10^{14}$ microorganisms per ml., administered 3 days in succession.

This test is to ensure that the absorption has not brought about any modification of the intestinal transit in any of the animals, but has, on the contrary, very distinctly improved the appearance and odour of the stools, notably in the pig.

(2) On subcutaneous injection in mice, guinea pigs and rabbits in a dosage of 50 million microorganisms
(3) By intraperitoneal injection in mice, in a dosage of 20 million, and in guinea pigs in a dosage of 50 million microorganisms
(4) By intravenous injection in rabbits in a quantity of one thousand million microorganisms.

Preferably two different strains of *Escherichia coli* are used in the process of the invention each of which is cultivated in the presence of antibiotics on the standard medium of the Institut Pasteur in order to confer thereon a resistance to antibiotics. The standard medium of the Institut Pasteur is defined in the book Milieux de Culture, volume 1, pages 97 and 98, by H. Cassagne, Chief of the Laboratory at the Institut Pasteur, published by Editions de la Tourelle, St. Mande, France, Depot legal 3ᵉ trimestre 1961. The antibiotics may be the same, used in the same amounts as for the lactic ferment. When the desired resistance to antibiotics has been acquired, each strain is separately cultivated on successive mixtures of peptone-containing water and the milk culture medium of the invention, the mixtures having an increasing content of the latter. Thus, the culture may be conducted on mixtures comprising about 50% and then 35% and then 20% and finally 10% by volume of peptone-containing water. The peptone-containing water used preferably contains 15 g. of peptone, 5 g. of sodium chloride and 1 g. of lactose per litre, its pH having been adjusted to 7.6 by the addition of sodium hydroxide. The final culture medium used is the following:

| | Ml. |
|---|---|
| Milk-based culture medium of the preferred composition given above | 900 |
| Peptone-containing water | 100 |

For each culture, the medium is twice sterilized at 100° C., with an interval of 24 hours between sterilizations, to ensure its sterility. Seeding is then carried out and the medium is incubated at 37° C. until a curdled mass is obtained which takes 1 to 2 days. The lactic acid content is then of the order of 0.6% to 0.8% and the number of revivifiable microorganisms about $10^{11}$ to $10^{14}$ per ml., the count being effected with the use, as medium, of the culture medium itself.

The medium may then be homogenised, frozen, for example at about −60° C., and lyophilized. Before homogenisation, the lactic acid produced may be neutralised by the addition of sterile aqueous trisodium phosphate solution to obtain a pH of about 6.5. Generally speaking, about 3 g. of phosphate per litre of medium must be added.

In order to prepare the medicament of the invention the lyophilized culture of *Lactobacillus acidophilus*, and a mixture (in equal weights) of the lyophilized cultures of the two strains of *Escherichia coli* are mixed, generally in equal weights. However, the relative proportions may be modified to meet particular requirements.

The medicament may also contain the product of lyophilization of a culture of a strain of *Bifidibacterium bifidus*, taken from the stool of a healthy unweaned child, cultivated in accordance with a usual technique on medium VF, the whole culture being thereafter lyophilized. The quantity added may be of the same order as that of the lyophilized culture of *Lactobacillus acidophilus* or a little less.

The pharmacological properties of the new medicament are related, on the one hand, to the special influence of the constituents of the lactic medium which accompanies them, and on the other hand to a particular property of co-action shown by *Lactobacillus acidophilus* and *Escherichia coli*.

It has already been observed that the success of the intestinal implantation or re-implantation of lactic bacilli, as also of *Escherichia coli*, after therapy by antibiotics, depends upon a fairly large number of factors and that, broadly speaking, it is a first dependent on the possibility of renewal, and survival, of the living microorganisms administered and also on their number and nature. Now, although it was previously possible to produce strains of antibiotic-resistant lactic ferments, it was only possible to record their disappearance in the presence of microorganisms such as *Proteus, Pseudomonas (pyocyaneus)* and *Staphylococcus aureus*, as also their variable, but rather bad, resistance to the presence of *Escherichia coli*.

Now, in this respect, a fundamental property of the new medicament arises out of the particular effect which has been produced by the milk and the substances accompanying it on non-pathogenic strains of Escherichia in the culture stage. For enterobacteria, which would adapt themselves badly, or not at all, to the presence of lactic bacillus, if such various microorganisms were merely administered as such, there are substituted in the medicament of the invention variants endowed with the possibility of proliferating in the presence of *Lactobacillus acidophilus*. Thus, the new medicament makes it posble to produce in the human organism, without any precarious period of adaptation in vivo, the simultaneous development of non-pathogenic *Lactobacillus acidophilus* and *Escherichia coli* in the pattern of a healthy enteral symbiosis, with the gradual elimination of the undesirable concurrent flora.

In addition, the substances originating in the milk and those added to the milk, favour the implantation or re-implantation and the proliferation of the microorganisms present beside them in the medicament in the four following ways.

(a) By stimulating the digestive secretions, by the action of the three basic amino acids (lysine, histidine and arginine), and restoring the normal intestinal transit by the histaminopexic power of the gastro-pyloric mucin of the pig.

(b) By suppressing, as a result of the buffer power of the mucin, reinforced by the presence of the basic amino acids, excessive fluctuations of the acid-base equilibrium in the intestine, having regard to the fact that the acid ions ($H^+$) limit the growth of lactic ferments.

(c) By protecting the microorganisms supplied by the medicament against the destruction which they might undergo under the effect of digestive juices, this protection being due firstly to the resistance imparted to the *Lactobacillus acidophilus* as a result of its culture on milk and secondly to the protective effect of the mucin.

(d) By protecting the mucous membrane of the colon, the integrity of which is essential to its immunobiological symbiosis with *Escherichia coli*.

It should be noted that the mucin also protects certain vitamins, notably vitamin $B_{12}$, against destruction by the action of the digestive juices.

Finally, the milk containing gastropyloric mucin of the pig and the three basic amino acids contains the growth factors necessary for *Lactobacillus acidophilus* and *Escherichia coli*, notably the factor bifidus, the factor called "animal protein factor," strepogenin, and lysine.

The medicament of the present invention is useful in the treatment of colitis, gastroenteritis and enterocolitis in infants and adults.

The invention accordingly includes within its scope pharmaceutical compositions for oral administration comprising the new medicament and a pharmaceutical carrier.

The new medicament is preferably presented for pharmaceutical purposes under an enteric coating, more especially in gelatine capsules containing a mixture of lyophilized or dried powders. Typical examples of compositions for a gelatine capsule are the following (the therapeutic unit may be a box containing from 16 to 20 capsules):

(a)

| | Mg. |
|---|---|
| Lyophilized culture of *Bacillus acidophilus* | 50 to 100 |
| Mixture of the lyophilized cultures of the two strains of *Escherichia coli* | 50 to 100 |

(b)

| | |
|---|---|
| Lyophilized culture of *Bacillus acidophilus* | 50 to 150 |
| Mixture of the lyophilized cultures of the two strains of *Escherichia coli* | 50 to 150 |
| Lyophilized culture of *Bifidibacterium bifidus* | 20 to 50 |

The latter composition is suitable for infants. Approximately equal weights of the different lyophilized cultures are ordinarily used.

It is desirable to add to the mixtures of lyophilized cultures, in the case of the composition for infants, Raynaud's Bifidus II factor (the mucin supplying, in its turn, the Bifidus I factor) and also strepogenin, especially in the form of an enzymatic autolysate of fish liver or casein. Such an autolysate may be added to the contents of the gelatine capsule. However, owing to the hygroscopic character of autolysates when they are in powder form, they may be presented separately, in a sealed ampoule, the contents of which are incorporated in the milk in the feeding bottle.

It has also been found that instead of separately lyophilizing the culture of *Lactobacillus acidophilus* and the mixture of *Escherichia coli* cultures and mixing the lyophilized products, it is often advantageous to mix the cultures first and to maintain the mixture for some time at room temperature before effecting lyophilization.

*Escherichia coli* is known to be a histamine-producing proteolytic microorganism. The quantity of histamine produced depends upon the strains employed. Some strains are so weakly proteolytic that only 10 to 30 microgrammes of histamine are finally found in one gramme of lyophilized product. On the other hand, while *Lactobacillus acidophilus* has hitherto been regarded as having no proteolytic action, it has surprisingly been found that histamine is present in commercial therapeutic ferments based upon *Lactobacillus acidophilus* and as much as 3000 microgrammes of histamine per gramme of lyophilized product may be present during the culture of this Lactobacillus on certain media.

While the invention is not dependent on any theoretical explanation, it appears that the histamine may be biosynthesised from constituents of the culture medium. It seems in particular that the biosynthetic production is favoured by acetate and glucose and takes place at the expense of the nitrogen-containing mineral salts present as traces in the culture medium. Regardless, however, of this explanation, it has been observed that after standing for some time at room temperature, not only was the mixture of *Lactobacillus acidophilus* and *Escherichia coli* cultures free from histamine, but the histamine formed in the respective culture media had disappeared, probably owing to the fact that it had been converted into histidine.

Thus, in accordance with one method of carrying out the invention, the cultures of *Lactobacillus acidophilus* and *Escherichia coli* may be mixed and maintained at room temperature until the presence of histamine is no longer traceable therein, i.e. in practice for a period of the order of 12 to 24 hours, and the mixture then lyophilized.

Apart from this change in the mode of preparation, the medicament is produced and presented as hereinbefore described. However, the medicament may be prepared, when it is intended for infants, from a mixture of about 2 parts by weight of a culture of *Lactobacillus acidophilus* and 1 part by weight of a mixed culture of *E. coli* setting apart the *Bifidibacterium bifidus* culture if any.

What I claim is:

1. Process for the preparation of a medicament which comprises the step of culturing separately, on milk containing gastro-pyloric mucin of the pig, lysine, arginine and histidine, *Lactobacillus acidophilus* and antibiotic-resistant non-pathogenic *Escherichia coli,* and the subsequent combined steps of lyophilizing the cultures so produced and mixing said cultures.

2. Process according to claim 1, in which two different strains of *Escherichia coli* are cultured.

3. Process according to claim 1, in which the *Escherichia coli* have been cultured on successive portions of lactic media containing decreasing proportions of aqueous peptone.

4. Process according to claim 1, in which a lyophilized culture of *Bifidibacterium bifidus* is mixed with the lyophilized cultures.

5. Process according to claim 1, in which strepogenin is mixed with the lyophilized cultures.

6. Process according to claim 1, in which the milk contains 0.5 to 15% by weight of mucin (calculated dry on the solids content of the milk) and about 0.5% by weight each of lysine, arginine and histidine.

7. Process for the preparation of a medicament which comprises culturing *Lactobacillus acidophilus* on milk containing gastro-pyloric mucin of the pig, lysine, arginine and histidine, culturing non-pathogenic *Escherichia coli* on milk containing gastro-pyloric mucin of the pig, lysine, arginine and histidine, mixing together the cultures thus produced, maintaining the culture mixture at room temperature until said mixture is free from histamine, and then lyophilizing the culture mixture.

8. Process for the preparation of a medicament which comprises culturing separately on milk containing gastro-pyloric mucin of the pig, lysine, arginine and histidine, antibiotic-resistant *Lactobacillus acidophilus* and antibiotic-resistant non-pathogenic *Escherichia coli,* mixing together the cultures thus produced, maintaining the culture mixture at room temperature until said mixture is free from histamine and then lyophilizing the culture mixture.

9. Process for the preparation of a medicament which comprises culturing separately on sterilized skim milk containing 0.5 to 15% by weight of gastro-pyloric mucin of the pig, calculated on the solids content of the milk, and about 0.5% by weight of lysine, arginine, and histidine, antibiotic-resistant *Lactobacillus acidophilus* and antibiotic-resistant non-pathogenic *Escherichia coli,* mixing together the cultures thus produced, maintaining the culture mixture at room temperature until the culture mixture is free from histamine, and then lyophilizing said culture mixture.

10. A medicament produced by the process claimed in claim 8.

References Cited by the Examiner

UNITED STATES PATENTS 2,697,663  12/1954  Tomarelli et al. _____ 99—54
2,811,450  10/1957  Petuely _____ 99—54

OTHER REFERENCES

Micro-Organisms and Fermentation, A. Jorgensen (1948), pp. 417–426 and 460–463.

Merck Index, 7th edition (1960), p. 980.

ALBERT T. MEYERS, *Primary Examiner.*

SAM ROSEN, JULIAN S. LEVITT, *Examiners.*

MARTIN COHEN, LEROY RANDALL,
*Assistant Examiners.*